H. N. GARSON.
AUTOMOBILE CHASSIS.
APPLICATION FILED APR. 22, 1921.

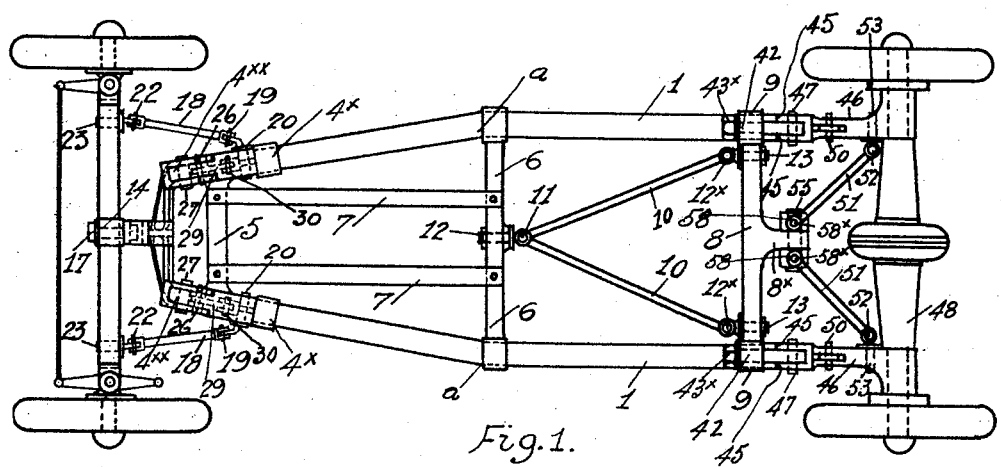

1,414,123.

Patented Apr. 25, 1922.
4 SHEETS—SHEET 2.

H. N. GARSON.
AUTOMOBILE CHASSIS.
APPLICATION FILED APR. 22, 1921.
1,414,123.
Patented Apr. 25, 1922.
4 SHEETS—SHEET 3.
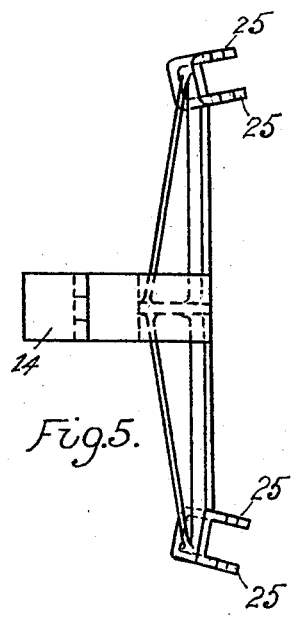
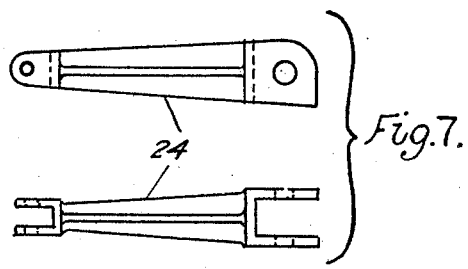
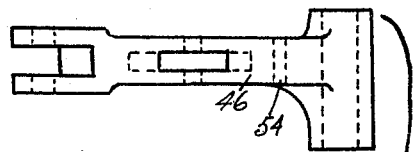
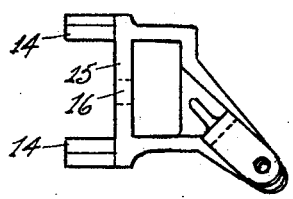
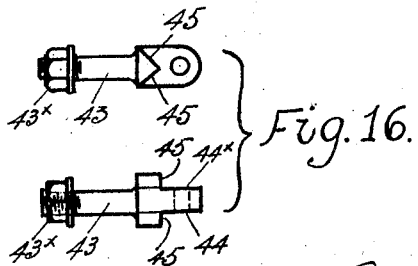
Henrik N. Garson INVENTOR.
BY
H. Lee Helms ATTORNEY.

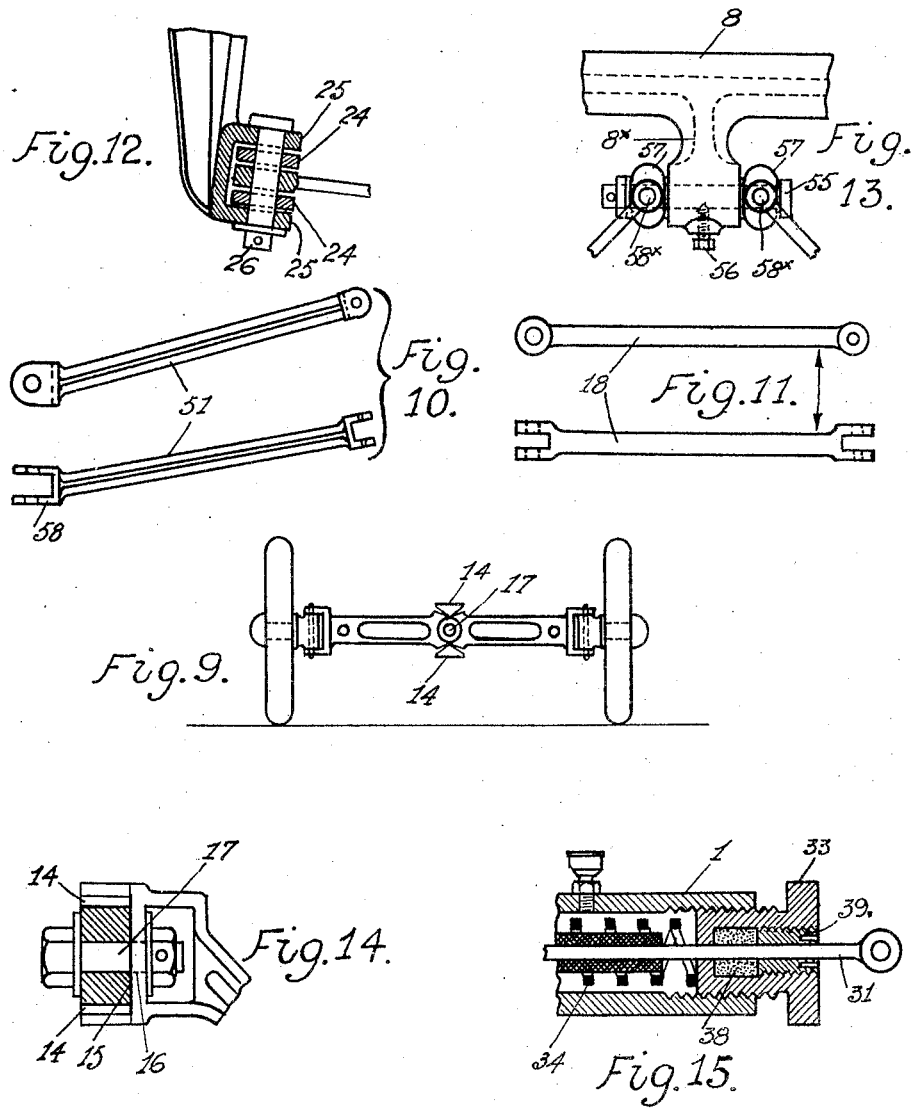

UNITED STATES PATENT OFFICE.

HENRIK N. GARSON, OF NEW YORK, N. Y.

AUTOMOBILE CHASSIS.

1,414,123.	Specification of Letters Patent.	Patented Apr. 25, 1922.

Application filed April 22, 1921. Serial No. 463,556.

*To all whom it may concern:*

Be it known that I, HENRIK N. GARSON, subject of the Kingdom of Norway, residing at New York, county and State of New York, have invented certain new and useful Improvements in Automobile Chassis, of which the following is a specification.

This invention has relation to invention described in my co-pending application, filed May 8, 1920, Serial No. 379,799, and the purpose of the invention is to provide an automobile chassis of novel design, the elements being so formed and assembled, that driving shocks upon the chassis elements are reduced to a major extent, substantially all weaving of the chassis and the body eliminated with consequent easy riding and low maintenance cost due to reduction of wear and tear on the chassis frame and body. Further objects of the invention will subsequently be pointed out.

The invention will be understood by reference to the accompanying drawings in which—

Fig. 1 is a plan view of a chassis illustrating an embodiment of the invention; and Fig. 2 is a side elevation, of the same.

Figure 5 is a plan view of the front rocker which constitutes the primary connecting member between the chassis frame and the front axle, and Fig. 6 is a side elevation of the same.

Fig. 7 illustrates an elevation and plan of the two connecting links intermediate the front rocker and the transverse frame member.

Fig. 8 illustrates in plan and elevation one of the two rear rocker members serving as a primary connection between the rear axle and the chassis frame.

Fig. 9 is an elevation of the front axle and

Fig. 10 illustrates in elevation and plan one of the two rear torque rods.

Fig. 11 illustrates in elevation and plan one of the two front torque rods.

Fig. 12 is a sectional plan view of the front rocker and its immediate connecting members.

Fig. 13 illustrates a sectional plan view of the rear transverse member of the chassis frame and its immediate connections with the rear torque rods.

Fig. 14 is a cross-sectional view of the front axle and its connection with the front rocker.

Fig. 15 is a sectional view of one of the two tubular frame members, at one end thereof, illustrating the mountings for the spring, and the adjustments therefor.

Fig. 16 illustrates in plan and elevation one of the two trunnion mountings for the rear rocker members.

Figure 3:
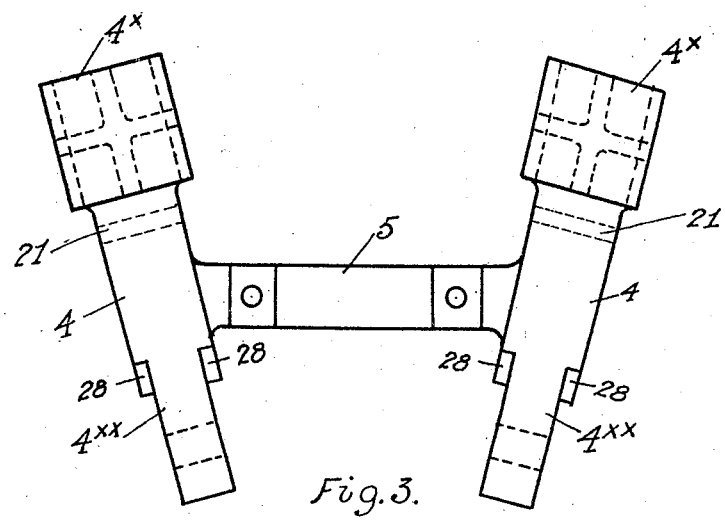
Fig. 3 is a plan view of the front transverse member of the chasis frame.
Figure 4:
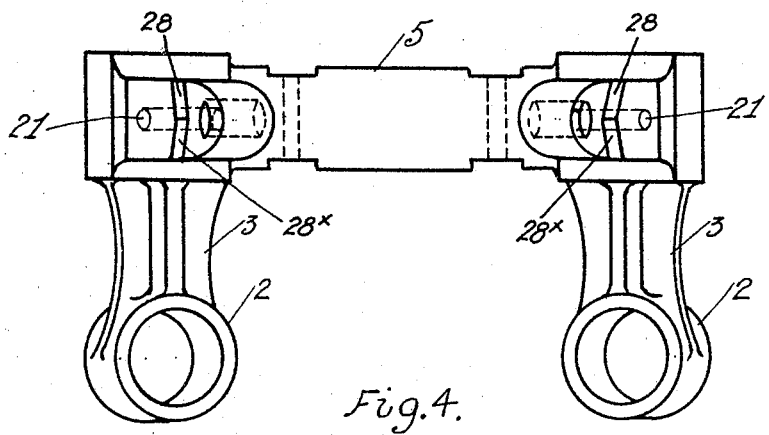
Fig. 4 is a front elevation of the same.

By reference to Fig. 1 it will be seen that in the embodiment of the invention illustrated in the drawing, the chassis frame consists of the tubular frame members 1, which, in the present instance, are bent out of parallelism at $a$ to be united at their front ends by means of the transverse frame member illustrated in Figs. 3 and 4. The said frame member consists of two sleeves 2, a web 3, rising from each sleeve, and connecting the latter with a horizontal arm 4 somewhat enlarged at $4^x$ to provide a supporting surface for the body of the car, and reduced at $4^{xx}$ to form a bearing member for a link which will later be described. The two sleeves 2, web 3, and arm 4, are connected by means of a transverse bracket arm 5.

To assist in maintaining the rigidity of the chassis frame, transverse tie members may be provided at suitable points, such as the transverse member 6 illustrated in Fig. 1. In the present instance the member 6 is connected with cross-arm 5 by means of the longitudinally extending struts 7.

At the rear of the chassis frame, the tubular frame members 1 are fitted within sleeves $7^x$, each sleeve being provided with an upwardly extending web $7^{xx}$, which merges into a transverse bracket member 8, formed at each end with the enlarged head 9, the construction being very similar to that illustrated in Figs. 3 and 4. The cross-arm member 6 and the member 8, are connected by means of tie rods 10, these rods at their front ends being connected by pin 11 to bolt 12 fitted within a suitable aperture formed in the cross member 6. It will be seen by reference to Figure 1 that each tie rod 10 at its rear end is connected at $12^x$ to a bolt 13 which is received within an aperture formed in member 8.

Referring, for the moment, to Fig. 9, it will be seen that the front axle is provided centrally at its top and bottom with V-shaped faces to receive wedge-shaped lugs 14 formed on the front rocker. The front rocker is provided with a web 15, formed with an aperture 16 for the reception of a bolt 17 which serves to secure the rocker in position on the axle. If desired, the surfaces of the rocker member 14 and the axle surfaces which they engage may be rounded so as to increase the bearing area, this being a mechanical detail which will be understood by those skilled in the art. The driving force is transmitted from the rocker to the front axle by the flat bearing face of the rocker web 15 and the alinement of the axle is maintained by means of the front torque rods 18, each rod being illustrated in detail in Fig. 11. It will be seen that the rear end of each front torque rod is pivotally connected at 19 to the extended end of a bolt 20 fitted within an aperture 21 formed in the bracket tie member (see Figs. 1 and 2). And the front end of each front torque rod 18 is pivotally connected at 22 to a bolt 23 fitted within a suitable aperture formed in the front axle, both of the bolts 20 and 23 being free to oscillate within their respective bearing apertures.

As will be seen by reference to Figs. 2 and 12, the bifurcated end of each link 24 is received within the larger bifurcated extension 25 at the appropriate end of the front rocker and the two members are pivotedly connected by means of a bolt 26. Each link 24 at its upper and enlarged end is bifurcated to embrace one of the two reduced front ends $4^{xx}$ of the front transverse frame member, and a bolt 27 serves to unite these members. It will be seen that each side face of the reduced end $4^{xx}$ of the said front transverse frame member is formed with shoulders 28 and $28^x$ which serve to limit the movement of link 24. At the lower end of link 24, disposed intermediate its bifurcations and mounted on bolt 26, is a short link 29 which is pivotally connected at 30 (see Fig. 2) to a rod 31 provided with a head 32 adapted to slide within its appropriate tubular frame member 1. Rod 31 also reciprocates within a central aperture formed in a closure and adjusting member 33, (Fig. 15) and head 32 engages a spring 34 which preferably is of somewhat less diameter than the internal diameter of the tubular member, so that it may "float" in said member, being supported, for example, upon a leather or felt collapsible sheath encircling the rod 31. On the opposite side of head 32 is disposed a second spring $34^x$ which abuts against the face of an internal reinforcing member 36, the said reinforcing member being provided with a central longitudinal opening 37 to serve as a guide surface for the rear end of rod 31. The closure and adjusting member 33 is threaded within the appropriate tubular member so that by advancing or retracting it the load carrying and bumper spring may be simultaneously adjusted as to tension, Fig. 15 The said member 33 is provided with a pocket 38 and a suitable packing may be disposed within this pocket, a plug 39 threaded within the pocket being employed to compress the packing about rod 31. In this manner lubricant contained within the tubular member is prevented from passing between the rod and member 33 and dust is excluded from the tubular member at all times. In Fig. 15 a valve is diagrammatically shown, through which lubricants may be admitted into the tubular member.

The construction of each rear half of the tubular frame member and the members which it enclosed may be exactly like that of the front half just described and therefore as to this no further description is necessary. It will be seen by Fig. 2 that the head 9 at each end of the rear transverse frame member is formed with a horizontal aperture 42 through which passes the bolt-like extension 43 of a trunnion which is illustrated in detail in Fig. 16, the extension of the trunnion being threaded to receive a nut $43^x$. The trunnion is formed with flat faces 41 and $44^x$, and at the rear of each face is formed two shoulders 45. Embracing the flat faces 44 and $44^x$ is the yoke-end of one of the two rear rocker members 46, a bolt 47 acting to pivotally secure the rocker to the trunnion. Each of the two rockers is secured to the rear axle 48. A link 49 is pivoted at one end 50, to the rocker, and the opposite end 51, to the appropriate rod 31. As heretofore stated, two torque rods are provided intermediate the rear axle and the transverse frame member 8. The rear end of each torque rod is pivotally connected at 52 to a bolt 53 free to oscillate in an aperture 54 formed in the appropriate rocker 46, the opposite end of each torque rod being secured by means of a universal joint to cross member 8, the construction being as follows: The cross member 8 is provided with a central rearwardly extending arm $8^x$, which is provided with a transverse aperture to receive a stud-shaft 55, preferably held in place by means of a set screw 56 (Fig. 13). Mounted to oscillate upon the said shaft 55 are two collars one at each side of the extension $8^x$ each collar being embraced by the yoke end 58 (Fig. 10) of the torque rod. A headed stud $58^x$ is tapped into each collar serving to hold the torque rod in position while permitting it to oscillate upon the collar.

The operation of a chassis constructed in accordance with the present embodiment of the invention is such that both the front and rear axle are permitted to "teeter" or oscillate about an axis which may be defined as extending longitudinally of the chassis through the median line thereof, and such movement of each axle does not affect the horizontal position of the chassis frame. In the action of the front axle this is permitted by the rocking of the axle upon the bolt 17 and the bearing faces of the front rocker, and although these faces are shown wedge-shaped in the drawing, they may be circular in form to afford the maximum bearing surface. The torque rods 18 which serve to maintain the front axle in alinement may be so connected as to permit the "teetering" movement of the front axle. For example the aperture in the bolt 20 for passage of pin 19 may be elongated. The specific means is a matter for those skilled in the art, being a mechanical detail.

Referring to the front end of the chassis, it will be seen that when one of the wheels passes over an obstruction no effect will be had upon the front rocker unless the obstruction is large, the front axle merely rocking about its central pivot. If both front wheels simultaneously pass over an obstruction, then the rocker will be given a movement upon its pivotal connections with the chassis frame, and its lowermost end will move inwardly, thus carrying head 32 toward the reinforcing member 37 and compressing the spring 31. It will be seen therefore that the spring $34^x$ in rear of head 32 acts as the load carrying spring. When the excess stress upon spring $34^x$ is removed by the return of the wheels to their normal position, there will be a quick reaction of the rocker which will move head 32 somewhat in advance of its normal position, such movement being momentary, and the shock will be absorbed by the spring 34 in advance of the head, the spring thus acting as a "bumper" spring.

When one of the rear wheels passes over an obstruction the arcuate movement of the appropriate rear rocker will slightly shorten the normal distance between rear torque rod connecting point 52 and the stud shaft 55 (Fig. 1) the result being that the collar is compelled to turn upon stud shaft 55 and at the same time a slight axial oscillation is given to link 49, and the rod 31; also the trunnion upon which the rocker is mounted turns slightly in its bearing afforded by the appropriate aperture in head 9. This movement has no effect upon the horizontal position of the chassis frame. When both wheels meet an obstruction the excess stress is thrown upon the spring in the rear of the head $32^x$, this being the load carrying spring, and the return of the wheels throws head $32^x$ forwardly beyond its normal position, the excess stress being taken up by the spring in front of the head, the latter thus serving as the bumper spring.

In view of the fact that each set of wheels is mounted so as to move in the arc of a circle, forwardly or rearwardly of the chassis frame as the case may be, very little shock is thrown upwardly by such movement, the major portion of the shock being absorbed by the translation of the stress to a horizontal plane, the stress being absorbed by the horizontally disposed springs. It will be noted that an important feature of the invention is the provision of means whereby the rockers may operate directly in conjunction with the transverse frame members, thereby permitting the employment of relatively light tubular members, performing the double function of receiving the springs and connecting the transverse frame members, the major load being thrown upon the transverse frame members.

Having described an embodiment of my invention, what I claim is:

1. In an automobile chassis, a frame comprising front and rear transverse members, front and rear axles, rockers serving to connect the axles to the frame, springs and connections between the same and the rockers for suspending the frame relatively to the axles, and tubular members adapted to receive the springs and acting as tie members for the front and rear transverse frame members, the direction of action of the springs being longitudinally of said tubular members.

2. In an automobile chassis, front and rear tranverse frame members, front and rear axles, rockers connecting each axle to its respective transverse frame member, springs and connections between the same and the rockers for suspending the frame relatively to the axles, and tubular members serving to receive said springs and as tie members for connecting the front and rear transverse frame members.

3. In an automobile chassis, a frame comprising front and rear transverse members, front and rear axles, rockers serving to connect the axles to the frame, springs and connections between the same and the rockers for suspending the frame relatively to the axles, and tubular members suspended by said front and rear transverse frame members and serving as tie members for the latter, the said tubular members enclosing the springs.

4. In an automobile chassis, a frame comprising front and rear transverse members, front and rear axles, rockers serving to connect the axles to the frame, springs and connections between the same and the rockers for suspending the frame relatively to the axles, tubular tie members extending lengthwise of the chassis and connecting the transverse frame members, the said tubular members enclosing the springs.

5. A chassis constructed in accordance with claim 1, in which the springs are enclosed within the tubular members and the connection with each rocker comprises a rod extending within the coils of its appropriate spring and provided with a head for engaging the end of the spring.

6. A chassis constructed in accordance with claim 5 in which the head is disposed intermediate the length of the rod and a load carrying spring and a bumper spring are disposed at opposite sides of the head for engagement by the latter.

7. A chassis constructed in accordance with claims 6 in which the tubular member enclosing the load carrying and bumper springs is provided with an internal reinforcing member formed with guiding walls for the rod.

8. A chassis constructed in accordance with claim 7 in which the internal-reinforcing member separates and acts as a counter-resistance member for two sets of load-carrying and bumper springs.

9. A chassis constructed in accordance with claim 1 in which the springs coacting with each rocker comprise load-carrying and bumper springs in combination with means for adjusting their tension simultaneously.

10. A chassis constructed in accordance with claim 5 in combination with a closure and adjusting member threaded in each end of the tubular member and formed with a central aperture for the passage of the rod.

11. A chassis constructed in accordance with claim 10 in which the closure and adjusting member is provided with a pocket surrounding the central aperture, a plug being threaded in the pocket for compression of a packing within the latter.

12. In an automobile chassis, a frame comprising front and rear transverse members, front and rear axles, rockers serving to connect the axles to the frame, springs and connections between the same and the rockers for suspending the frame relatively to the axles, the front axle at its median point being pivoted to enable a rocking movement thereof transversely of the chassis, and torque rods connecting the front axle, between its median line and each end thereof, with the chassis frame, said torque rods having pivoted connections to permit elevation of one end of the axle or both ends simultaneously.

13. In an automobile chassis, a frame comprising front and rear transverse members, front and rear axles, tie members for the transverse frame members, and a rocker pivotally connected at two points to the frame and pivotally connected at a single point to the front axle.

14. In an automobile chassis, a frame comprising front and rear transverse members, front and rear axles, tie members for the transverse frame members, a rocker pivotally connected at two points to the frame and having a yoke embracing the front axle at its central point and means for connecting the yoke and axle so that the latter may rock within the yoke.

15. In an automobile chassis, a frame comprising front and rear transverse members, front and rear axles, tie members for the transverse frame members, a rocker pivotally connected at two points to the frame and formed with a centrally disposed projecting yoke embracing the front axle and providing a bearing face at the rear of the same and a horizontally disposed pivot bolt passing through said face and through the axle.

16. A chassis constructed in accordance with claim 13 in which the rocker comprises a normally horizontally-disposed member intermediate the front axle and the frame and formed with a central forwardly projecting yoke having upper and lower bearing faces for engaging similarly formed axle faces and also having a flat rear face for engagement with the rear face of the axle, and also having spaced upwardly projecting arms for pivotal connection with the frame.

17. A chassis constructed in accordance with claim 13 in which the rocker is pivotally connected to the axle at the centre point of the latter and is provided with two spaced upwardly projecting arms, each arm being pivotally connected to a member of the frame, and stops carried by said frame member above and below the pivotal point of the arm so that the movements of the latter in reverse directions are limited.

18. In an automobile chassis, a frame comprising front and rear transverse members, front and rear axles, horizontally disposed springs at each side of the chassis and means for throwing the chassis-load upon a spring comprising a rocker having an upwardly projecting arm pivotally connected to the frame at a point above its appropriate spring and a second upwardly projecting arm having a connection with its appropriate axle, a spring engaging head, and a member pivotally connecting said arms at the base thereof to said spring-engaging head.

19. In an automobile chassis, a frame comprising front and rear transverse members and tie members therefor, front and rear axles, collars carried by the rear transverse frame member for oscillation relatively thereto, and connections intermediate the frame and the rear axle for permitting movement of the latter in transverse planes, including torque rods engaging said collars.

20. In an automobile chassis, a frame comprising front and rear transverse members and tie members therefor, front and rear axles, connections intermediate the frame and the rear axle for permitting bodily elevation thereof, collars carried by the rear transverse frame member for oscillation in directions longitudinally of the frame, and torque rods connecting the rear axle with said collars.

21. A chassis constructed in accordance with claim 20 in which the rear transverse frame member is provided with a centrally disposed projecting member, and a stud-shaft is carried by said projecting member to afford a bearing member for the collars.

In testimony whereof, I have signed my name to this specification in the presence of two subscribing witnesses.

HENRIK N. GARSON.

Witnesses:
    W. LEE HELMS,
    LILLIAN BECKER.